L. T. FREDERICK.
PROPELLER AND METHOD OF MAKING THE SAME.
APPLICATION FILED DEC. 30, 1918.
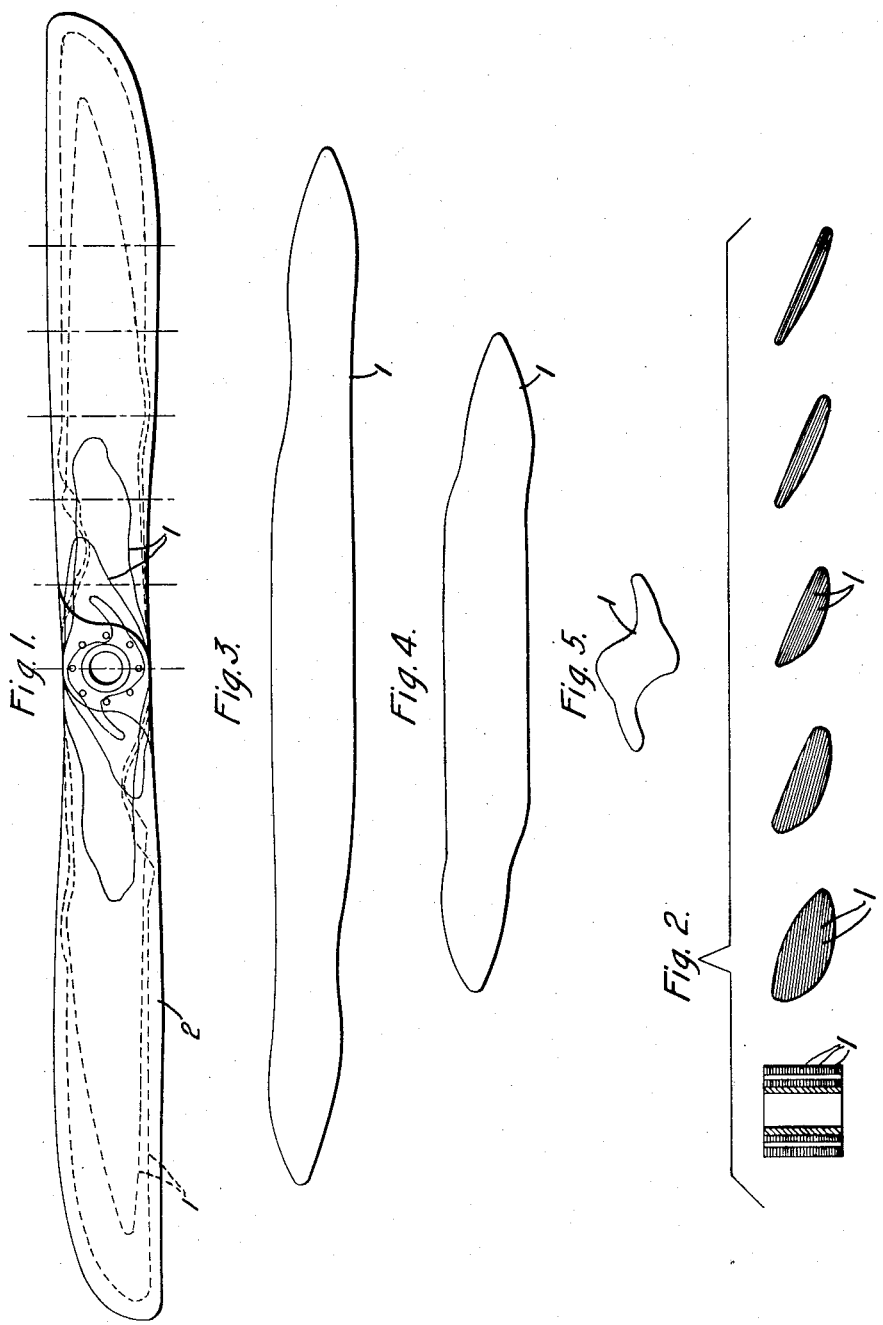
WITNESSES:
H. J. Shelhamer
W. H. Woodman.
INVENTOR
Louis T. Frederick
BY
Wesley G. Carr
ATTORNEY

UNITED STATES PATENT OFFICE.

LOUIS T. FREDERICK, OF WILKINSBURG, PENNSYLVANIA, ASSIGNOR TO WESTINGHOUSE ELECTRIC & MANUFACTURING COMPANY, A CORPORATION OF PENNSYLVANIA.

PROPELLER AND METHOD OF MAKING THE SAME.

1,406,365.

Specification of Letters Patent. Patented Feb. 14, 1922.

Application filed December 30, 1918. Serial No. 268,954.

*To all whom it may concern:*

Be it known that I, LOUIS T. FREDERICK, a citizen of the United States, and a resident of Wilkinsburg, in the county of Allegheny and State of Pennsylvania, have invented a new and useful Improvement in Propellers and Methods of Making the Same, of which the following is a specification.

My invention relates to air screws or propellers, and it has for its primary object the provision of a simple and effective method of constructing composite propellers of the type comprising superimposed layers of fibrous sheet material impregnated with a hardened binder.

In this connection, one of the objects of my invention consists in the provision of a novel method of so disposing the layers in the body of the propeller that a relatively small number of layers shall extend into the blade portions of the propeller, with the result that less labor is required in cutting out the layers, there is less likelihood of shifting of the layers while they are being positioned in the mold and while the propeller is being molded, a more positive closing of the mold is assured and a better balanced propeller will be produced.

Heretofore, propellers of the type comprising superimposed layers of fibrous sheet material impregnated with a hardened binder have been formed either by superimposing the layers in plane substantially parallel to the axis of the propeller hub or by disposing them in planes substantially parallel to the faces of the propeller hub. I have found that the advantages enumerated above may be attained by superimposing the layers with their intermediate portions parallel to the faces of the hub and with their blade-forming portions twisted to lie substantially parallel to the thrust faces of the blades. Consequently, another object of my invention is to provide a method by which propellers may be constructed with the layers disposed in this manner.

With these and other objects in view, my invention will be more fully described, illustrated in the drawings, in the several views of which corresponding numerals indicate like parts, and then particularly pointed out in the claims.

Fig. 1 is a diagrammatic plan view of the thrust face of a propeller, certain of the layers being indicated therein; Fig. 2 is a series of transverse sections taken at substantially the points indicated by the section lines in Fig. 1 and illustrating the disposal of the layers constituting the propeller, and Figs. 3, 4 and 5 are plan views of certain of the layers employed.

My improved propeller may comprise a plurality of layers of fibrous sheet material, such as duck, paper, cotton batting or the like, impregnated with a suitable binder, such as a phenolic condensation product, the layers being cut to the proper sizes and shapes and superimposed in proper relation to each other to form a propeller body which may then be cured in any suitable manner, as by subjecting it to heat and pressure, in a mold of proper shape. As the layers are superimposed, they may be disposed with their intermediate portions parallel to each other and to what will be the faces of the hub, and the blade-forming portions of the layers may be reversely twisted to lie substantially parallel with what will be the thrust faces of the blades.

In a copending application filed by D. A. Dickey, Dec. 30, 1918, Serial No. 268,949, and assigned to the Westinghouse Electric & Manufacturing Company, is disclosed a method of manufacturing propellers, of a somewhat similar type, which may well be followed, in its main steps, in the manufacture of my propeller. As there set forth, patterns are formed by passing sections through a model of a propeller parallel to each other and to the faces of the hub of the model, the sections being preferably uniformly spaced. Each of these patterns serves as a guide for cutting a plurality of layers of such character that, when the several groups of layers thus provided are superimposed in proper relative positions, a substantially propeller-shaped body will result which may be cured and hardened in any preferred manner. The above-referred-to application also indicates that a plurality of sheets of impregnated material may be "preformed" or made to adhere to each other to provide a compound plate of as many layers as there are to be layers cut by each pattern, so that compound layers may be cut from this "preformed" compound plate, one by each pattern, and these compound layers may be assembled, and the body thus formed may be molded. By this means, the number of cutting operations is reduced to the number of patterns employed.

In practising my present invention, I may obtain patterns in substantially the manner described in the above-referred-to application with the exception that the sections passed through the model of the propeller may be warped or twisted so as to have hub portions parallel to the faces of the hub of the model and blade portions parallel to the thrust faces of the blades of the model. By this method, a plurality of patterns, in some instances differing materially in shapes and sizes, may be provided which may be employed in cutting compound layers of properly treated fibrous sheet material.

In Fig. 1 I have shown, in full lines, certain of the layers 1 which are employed near the hub portion of the thrust face of the propeller and, in broken lines, certain other layers 1 which are employed near the back face of the propeller. These, together with the various layers shown in Figs. 3, 4 and 5, indicate the relative shapes and sizes of a series of the layers, although it will be appreciated that a much larger number of distinctively shaped layers will be employed.

When the several compound layers have been provided, by the employment of the patterns, they may be disposed in a mold in proper superimposed positions, the several layers or sheets, constituting each of the compound layers, preferably being separated as they are placed in the mold and all of the layers being twisted so that their blade-forming portions will be disposed substantially parallel to the thrust faces of the mold. The mold may then be closed, and the assembled propeller body may be cured and hardened by subjecting it to heat and pressure while in the mold.

Fig. 2 best illustrates the actual construction of my propeller 2. As here shown, the several laminations or layers 1 comprising the body of the propeller are disposed with their intermediate, or hub-forming, portions substantially parallel to the faces of the hub while their blade-forming portions are twisted to lie in planes substantially parallel with the thrust faces of the blades although, of course, this will not be true of the portions of the layers immediately adjacent the hub potrions, as the twisting should not be too abruptly done.

For example, Figs. 1 and 2 may be assumed to show an 8-foot propeller having a 24° pitch, and the sections may be assumed as taken at 6-inch intervals from the hub outwardly. When forming such a propeller, the layers in the hub will be parallel with the hub faces and the layers may well be twisted so that, at six inches from the hub, they will lie at an angle of approximately 8°, at 12 inches from the hub, they will lie at an angle of approximately 16° and, at 18 inches, they will lie at an angle of approximately 24° or parallel with the thrust faces of the hub, it being, of course, understood that this angle or inclination will be maintained throughout the remaining length of the layers.

While, with any given sheet material, the same number of layers will be required in the hub portion of my propeller as are required in the propeller disclosed by D. A. Dickey in his previously-referred-to application, a much smaller number of the layers will extend into the blades of the propeller, and the majority of all of the layers which extend into the blades will extend the full length thereof. Because of this, the labor of cutting out the compound layers is materially decreased, as the number of long unwieldy layers is largely decreased.

Furthermore, the relatively few long layers extending into, and forming, the blade portions of the propeller are substantially the width of the propeller blades, instead of being relatively narrow, as is the case when the layers are to be parallel to the propeller hub-faces throughout their length, and they may, therefore, be more readily superimposed and properly positioned in the mold.

In addition to this ease of assembling, the shaping and method of disposing the layers, by practising my invention, are such that there is practically no likelihood of any shifting of the material during molding and are also such that a more positive closing of the mold may be obtained. It should be noted that, inasmuch as the layers are symmetrical and are symmetrically disposed in the mold, a well balanced propeller is assured.

Obviously, various methods of obtaining suitable patterns may be followed, different sheet materials and different binders may be employed and different methods of cutting the layers from the sheet material by the employment of the patterns may be practised. As a result, no limitations are to be imposed on my invention other than those indicated in the appended claims.

I claim as my invention:

1. A propeller comprising superimposed layers of fibrous sheet material impregnated with a hardened binder in which the hub-forming portions of the layers are disposed substantially parallel to the faces of the hub while the blade-forming portions of the layers are disposed substantially parallel with the thrust faces of the blades.

2. A propeller comprising superimposed layers of fibrous sheet material impregnated and joined by a hardened binder in which the intermediate portions of the layers are disposed substantially parallel with the faces of the hub and the end portions are reversely twisted to lie substantially parallel with the thrust faces of the blades.

3. The method of forming a propeller which comprises forming a plurality of layers of suitable shapes and sizes from fibrous sheet material impregnated with a binder, superimposing the layers in proper relative positions and reversely twisting their end portions to provide a substantially propeller-shape body, in which the blade-forming portions of the layers are disposed substantially parallel with the thrust faces of the blades and the intermediate portions parallel to the faces of the hub, and compressing and curing the body thus formed to shape it and harden the binder.

4. The method of forming a propeller which comprises forming a plurality of layers of suitable shapes and sizes from fibrous sheet material impregnated with a phenolic condensation product, stacking the layers in proper relative positions and reversely twisting their terminal portions to form a substantially propeller-shape body, in which the intermediate portions of the layers are disposed substantially parallel with the faces of the hub and the terminal portions are disposed substantially parallel with the thrust faces of the blades, and subjecting the body thus assembled to heat and pressure in a mold to compact and shape it and harden the phenolic condensation product.

In testimony whereof, I have hereunto subscribed my name this 21st day of Dec., 1918.

LOUIS T. FREDERICK